Patented Feb. 24, 1931

1,794,097

UNITED STATES PATENT OFFICE

HENRY J. WEILAND AND IVAN GUBELMANN, OF SOUTH MILWAUKEE, WISCONSIN, ASSIGNORS, BY MESNE ASSIGNMENTS, TO NEWPORT CHEMICAL CORPORATION, A CORPORATION OF DELAWARE

METHOD OF ISOLATION AND PURIFICATION OF BENZIDINE AND ITS SUBSTITUTION PRODUCTS

No Drawing.   Application filed August 18, 1926.   Serial No. 130,114.

This invention relates to a method of isolation and purification of benzidine and its substitution products from their naturally occurring impurities and to the method of manufacture of technical benzidine compounds in a high state of purity.

In the production of benzidine and its substitution products by the general method of reduction and transformation of the corresponding nitro derivatives, there are formed as by-products appreciable quantities of azo derivatives, phenyl amines, inorganic residues, and isomeric derivatives. In order to obtain benzidine and substituted benzidines in a high state of purity, their bases must be freed from these impurities.

The general methods of isolation, as appearing in the literature and also found by experience, include an isolation of some salt of the base, as for instance, the hydrochloric acid salt, sulfuric acid salt, zinc double salt, and the like. The next step in the purification is a re-solution of the isolated or purified salt, followed by a basing of the salt by means of an alkali, such as sodium, potassium, or ammonium-hydroxide or carbonate. This long method of isolation and purification does not give a base of exceptionally high quality and, for some uses, even a vacuum distillation of this quality of base has been recommended.

Without a vacuum distillation, it is practically impossible to obtain an ash free product, for the reason that the inorganic salts such as iron and zinc are largely precipitated out by the basing operation as oxides along with the base.

It has also been proposed to extract benzidine from the based transformation mass by means of ether, to evaporate off the ether and to recrystallize the residues from hot water. The benzidine obtained by this method has a substantially lower melting point than that obtained according to the present invention and furthermore includes the step of extracting and separating the liquid layer, which on the large scale in working with technical hydrazo benzene leads to emulsions which can be separated only with great difficulty and fire risk.

It has further been proposed to isolate the benzidine by basing the transformation mass and separating off the benzidine and organic impurities and subsequently recrystallizing the benzidine from dilute alcohol. The additional step of isolating and the employment of a water soluble solvent make the process cumbersome and no substantial improvement is realized over the general method of isolating the benzidine sulfate and subsequently basing it and fractionally distilling. Alcohol could not be economically adopted as a crystallizing medium in the present invention on account of its miscibility in the based transformation mass and furthermore the necessity of a fractional distillation for recovery of alcohol of sufficient strength for reuse in a subsequent batch.

It is, therefore, an object of our invention to provide a simple and practicable method for the isolation and purification of benzidine and its substitution products from their naturally occurring impurities.

It is a further object of our invention to provide a method for the technical manufacture of benzidine and its substitution products in a high state of purity.

It is a further important object of our invention to provide a method for the isolation and purification of benzidine and its substitution products wherein one step of the process includes the removal of alkali insoluble inorganic residues to produce an ash free product.

Other and further important objects of our invention will become apparent from the following specification and the appended claims.

We have discovered a method which gives practically pure products by a simpler procedure than those above described. Our method requires but one isolation and, therefore, constitutes an improvement over known methods of manufacture. In addition to the shortening of the labor required in the manufacture by our method, the remarkably high quality of the product obtained when compared with the product of all other known methods, has led us to believe that our combined method of purification and isolation possesses remarkable advantages over heretofore known methods.

Our method is based upon the fact that benzidine and its substitution products are quite insoluble cold in certain organic solvents, such as benzene, toluene, xylene, chlor-benzene, gasolene and the like, whereas the by-products are sufficiently soluble to furnish a means of purification. These solvents are all immiscible with water and are of low enough boiling point to be readily removed from the final product by a drying step. It is furthermore to be noted that each one of the specified solvents, on account of its immiscibility in water, can be readily recovered for reuse without a fractional distillation step. Our method, therefore, includes a crystallization of the products of the based transformation mass from such organic solvents. By a hot filtration of the solution of the based transformation mass, there are eliminated the insoluble inorganic residues, such as iron oxide, zinc oxide and others, thus giving practically an ash-free solution of the base and by-products in the solvent, which, after cooling down, will precipitate pure base. Only a few of the possible solvents are mentioned above, as it will appear obvious that any solvent that is immiscible with water and which will hold the by-products in solution cold and allow the pure base to precipitate out will work equally well in principle. Using solvents as mentioned above, we have been able to obtain these bases in an exceptionally high state of purity in one isolation. The crystallizing points on the bases prepared as above on large scale manufacture in comparison with chemically pure products are:

|  | As prepared | Chemically pure |
|---|---|---|
| Benzidine | 127.6° | 128.0° C. |
| Tolidine | 129.0° | 129.3° C. |
| Ortho-dianisidine | 136.5° | 137.0° C. | with an actual purity of our prepared product in base content of 99.0-99.5%.

Without limiting our invention to any particular procedure, the following examples, in which parts by weight are given, illustrate the application of our invention in the preferred form.

*Example 1*

Benzidine 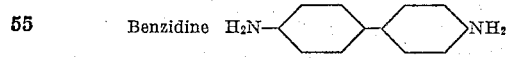

To the transformation mass containing 184 parts of benzidine as hydrochloride, sulfate, or zinc double salt, an excess of dilute mineral acid, inorganic residues, azo benzene, and isomeric bases, there is added sufficient caustic soda solution 40° Bé. to give an alkaline reaction, the caustic soda solution to be added either before or after adding 3,000 parts by volume of benzene. The based mass is then heated to about 68° C., until the base is in solution in the benzene. This benzene solution is then filtered hot to separate off the insoluble inorganic residues. A portion of the benzene is then distilled off from the filtrate until there is left a total of about 200 parts by volume of benzene. The undistilled portion is then cooled down to 20° C., whereupon precipitation of the benzidine occurs. The benzidine is now filtered, and the filter cake washed with 100 parts by volume of cold benzene and dried at 100° C. The yield is 178 parts of benzidine having a crystallizing point of 127.6°-128.0° C. and a total base content of 99.0-99.5%, as determined by titration.

*Example 2*

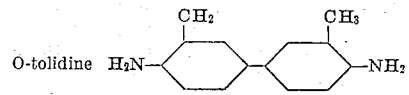

To the transformation mass containing 212 parts of O-tolidine as a hydrochloride, sulfate, or zinc double salt, an excess of dilute mineral acid, azo toluol, isomeric bases, inorganic residues and the like, there is added sufficient caustic soda solution 40° Bé. to give an alkaline solution on test paper, either before or after adding 3,000 parts by volume of toluene. The based mass is then heated up until all the base is in solution (about 75° C.). This toluene solution is then filtered hot to separate off the inorganic insoluble residues. A part of the toluene is then distilled off from the filtrate until there is left a total of 200 parts by volume of toluene. This is then cooled down to 20° C., whereupon the O-tolidine separates out, leaving the organic impurities in solution. The solution is then filtered, and the filter cake washed with 100 parts by volume of toluene and dried at 100° C. The yield is 208 parts of ortho-tolidine with a crystallizing point of 129.0°-129.2° C., and a total base content of 99.0-99.5%, as shown by titration. As commercially prepared, according to this example, ortho-tolidine is a light, buff-colored, crystalline powder, much lighter in color than the heretofore known technical product.

*Example 3*

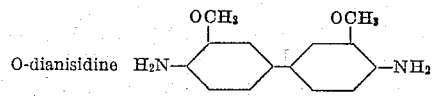

To the transformation mass containing 244 parts of dianisidine as a hydrochloride, sulfate, or zinc double salt, an excess of dilute mineral acid, inorganic residues, azo anisol, and decomposition by-products, there is added sufficient caustic soda solution 40° Bé. to give an alkaline reaction, either before or after adding 3,000 parts by volume of toluene. The based mass is then heated up to about 75° C. until all the dianisidine is in solution. It is then filtered hot to separate off the insoluble inorganic residues. The toluene is then distilled off from the filtrate, until there is left a total of 250 parts by volume of toluene. This is then cooled to 20° C., whereupon the O-dianisidine separates out, leaving the organic impurities and by-products in solution. The solution is then filtered, and the filter cake washed with 100 parts by volume of cold toluene and dried at 100° C. The yield is 239 parts with a crystallizing point of 136.7–137.0° C., and a base content of 99.0–99.5%, as shown by titration. The commercial dianisidine made according to the above example is a light gray crystalline powder which does not become violet on exposure to light and air, whereas the technical product heretofore known is deep purple in color.

In each of the processes as described in the above examples, it should be noted that there is no intermediate isolation of the benzidine body in its basic state but simply the one final isolation. After the hot filtration and the distillation of the major portion of the organic solvent, the remaining mixture comprises a relatively large volume of alkaline aqueous solution and a relatively small volume of the organic solvent containing the dissolved benzidine body. The crystallization of the benzidine body is effected directly from this mixture by cooling.

It will be understood that, although in the examples cited, the starting material in each case was the transformation mass, similar methods could also be applied to purify the present technical substances, benzidine and its substitution products, in which case the intermediate step of basing could be omitted, since the technical substances are already in the basic state.

It will further be understood that by benzidine and its substitution products, or compounds of the benzidine family, is meant any compound of the general formula:

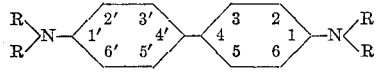

wherein R may be either a hydrogen atom or an aryl or alkyl group and wherein any of the hydrogen atoms in 2, 2′, 3, 3′, 5, 5′ and 6, 6′ positions may be substituted, as by halogen, alkyl, or an alkoxy group. Although the solvents used in the above examples are all of the type

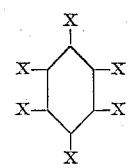

wherein X may be a hydrogen or halogen atom or an alkyl group, it should be noted that other suitable solvents of the aliphatic series, such as gasolene may also be used.

We are aware that numerous details of the process may be varied without departing from the spirit of this invention and we do not desire limiting the patent granted hereon otherwise than necessitated by the prior art.

We claim as our invention:

1. The method of isolation and purification of substituted benzidines from their naturally occurring impurities, which comprises basing salts of the substituted benzidines in the presence of a sufficient quantity of toluene to dissolve the bases of the substituted benzidines and crystallizing out the substituted benzidines from the resulting toluene solution.

2. The method of isolation and purification of ortho-dianisidine from its naturally occurring impurities, which comprises basing a salt of the impure ortho-dianisidine in the presence of a sufficient quantity of toluene to dissolve the base of the ortho-dianisidine and crystallizing out the ortho-dianisidine from the resulting toluene solution.

3. The method of isolation and purification of substituted benzidines from their naturally occurring impurities, which comprises treating salts of the substituted benzidines and impurities with an alkaline solution in sufficient quantity to give the resulting solution an alkaline reaction and with sufficient solvent of the type:

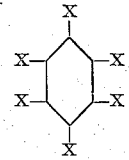

wherein X may be a hydrogen or halogen atom or an alkyl group, to dissolve the substituted benzidines, separating the insoluble impurities, crystallizing out the substituted benzidines, and separating the same from the mother liquor containing the dissolved impurities.

4. The process of purifying a member of the benzidine family, which comprises dissolving the bases of said bodies in toluene and crystallizing the relatively less soluble benzidine bases from the toluene containing the dissolved impurities while leaving the said impurities in solution.

5. The method of isolation and purification of a compound of the benzidine family from its naturally occurring impurities, which comprises treating a salt of the impure benzidine compound with an alkaline aqueous solution in sufficient quantity to give the resulting solution an alkaline reaction and with a sufficient quantity of a water immiscible organic solvent to dissolve the benzidine compound when hot, separating the insoluble impurities, crystallizing out the benzidine compound from said organic solvent without any intermediate isolation of the benzidine compound and recovering the crystallized benzidine compound.

6. The method of isolation and purification of a compound of the benzidine family from its naturally occurring impurities, which comprises basing a salt of the impure benzidine compound in the presence of a sufficient quantity of an organic solvent that is immiscible with water to dissolve the base of the benzidine compound when hot and crystallizing out the benzidine compound in its basic state from the resulting solution without precipitating the dissolved impurities and without intermedate isolation of the base of the benzidine compound.

7. The method of isolation and purification of dianisidine from its naturally occurring impurities, which comprises treating a salt of impure dianisidine with an alkaline aqueous solution in sufficient quantity to give the resulting solution an alkaline reaction and with a sufficient quantity of a water immiscible organic solvent to dissolve the dianisidine when hot, separating the insoluble impurities, crystallizing out the dianisidine from said solvent and separating said crystallized dianisidine from the mother liquor containing the dissolved impurities.

8. The method of isolation and purification of ortho-dianisidine from its naturally occurring impurities, which comprises basing a salt of the ortho-dianisidine in the presence of a sufficient quantity of an organic solvent that is immiscible with water to dissolve the base of the ortho-dianisidine hot and crystallizing out the ortho-dianisidine in its basic state from the resulting solution without precipitating the dissolved impurities and without intermediate isolation of the ortho-dianisidine base.

9. The method of purification of an impure body having the benzidine formula:

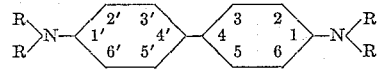

wherein R may be either a hydrogen atom or an alkyl or aryl group and wherein any of the hydrogen atoms in 2, 2′, 3, 3′, 5, 5′ and 6, 6′ positions may be substituted by a halogen, an alkyl, or an alkoxy group, which comprises basing a salt of such body in an alkaline aqueous solution dissolving the based body in an organic solvent that is immiscible with water, crystallizing said body from said solvent and separating and drying the resulting purified body.

10. The method of purification of an impure body having the benzidine formula:

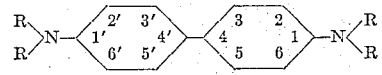

wherein R may be either a hydrogen atom or an alkyl or aryl group and wherein any of the hydrogen atoms in 2, 2′, 3, 3′, 5, 5′ and 6, 6′ positions may be substituted by a halogen, an alkyl, or an alkoxy group, which comprises basing a salt of such body, dissolving the based body in toluene, crystallizing said body out of its toluene solution without precipitating the impurities and recovering the crystalline body.

11. The method of purification of an impure body having the benzidine formula:

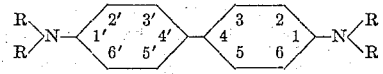

wherein R may be either a hydrogen atom or an alkyl or aryl group and wherein any of the hydrogen atoms in 2, 2′, 3, 3′, 5, 5′ and 6, 6′ positions may be substituted by a halogen, an alkyl, or an alkoxy group, which comprises basing a salt of said body in an alkaline aqueous solution dissolving the based body in hot toluene, cooling the mass, and crystallizing said body out of its toluene solution without precipitating the impurities and without intermediate isolation of the based body.

12. The method of purification of an impure body having the benzidine formula:

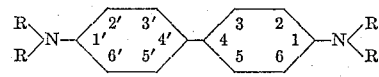

wherein R may be either a hydrogen atom or an alkyl or aryl group and wherein any of the hydrogen atoms in 2, 2′, 3, 3′, 5, 5′ and 6, 6′ positions may be substituted by a halogen, an alkyl or an alkoxy group, which comprises basing a salt of such body, without isolation dissolving the based body in a liquid solvent of the type:

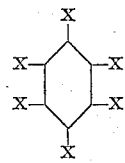

wherein X may be a hydrogen or halogen atom or an alkyl group and crystallizing said body out of solution without precipitating the impurities.

13. The method of purification of an impure body having the benzidine formula:

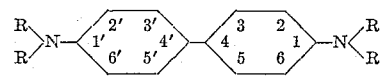

wherein R may be either a hydrogen atom or an alkyl or aryl group and wherein any of the hydrogen atoms in 2, 2′, 3, 3′, 5, 5′ and 6, 6′ positions may be substituted by a halogen, an alkyl or an alkoxy group, which comprises basing a salt of said body, without isolation dissolving the based body in a hot liquid solvent of the type:

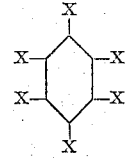

wherein X may be a hydrogen or halogen atom or an alkyl group, cooling the mass and crystallizing said body in its basic state out of solution without precipitating the impurities.

14. The method of purification of an impure body having the benzidine formula:

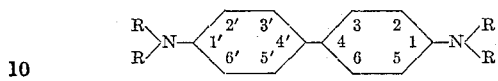

wherein R may be either a hydrogen atom or an alkyl or aryl group and wherein any of the hydrogen atoms in 2, 2′, 3, 3′, 5, 5′ and 6, 6′ positions may be substituted by a halogen, an alkyl, or an alkoxy group, which comprises basing a salt of said body, without isolation dissolving the based body in a hot liquid solvent of the type:

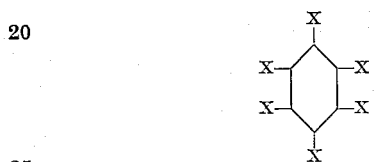

wherein X may be a hydrogen or halogen atom or an alkyl group, filtering the heated mass to remove insoluble impurities, cooling the mass, and crystallizing said body in its basic state out of solution without precipitating the impurities.

15. The process of purifying a member of the benzidine family, which comprises dissolving the impure bases of said bodies in an organic solvent that is immiscible in water and whose boiling point is sufficiently low that it can be removed from the final product by drying and crystallizing the relatively less soluble benzidine bases from the solvent containing the dissolved impurities.

16. The method of isolation and purification of benzidine from its naturally occurring impurities, which comprises converting a salt of an impure benzidine into the free base in the presence of a sufficient quantity of an organic solvent that is immiscible with water to dissolve the benzidine base when hot and crystallizing out the benzidine in its basic state from the resulting solution without precipitating the dissolved impurities and without intermediate isolation of the benzidine base.

17. The method of isolation and purification of o-tolidine from its naturally occurring impurities, which comprises converting a salt of impure tolidine into its free base in the presence of a sufficient quantity of an organic solvent that is immiscible with water to dissolve the tolidine base when hot and crystallizing out the tolidine in its basic state from the resulting solution without precipitating the dissolved impurities and without intermediate isolation of the o-tolidine base.

18. The process of purifying benzidine, which comprises dissolving the impure base of benzidine in the presence of water in an organic solvent that is immiscible in water and whose boiling point is sufficiently low that it can be removed from the final product by drying and crystallizing the relatively less soluble benzidine base from the solvent containing the dissolved impurities.

19. The process of purifying o-tolidine, which comprises dissolving the impure base of o-tolidine in the presence of water in an organic solvent that is immiscible in water and whose boiling point is sufficiently low that it can be removed from the final product by drying and crystallizing the relatively less soluble o-tolidine base from the solvent containing the dissolved impurities.

20. The process of purifying o-dianisidine which comprises dissolving the impure base of o-dianisidine in the presence of water in an organic solvent that is immiscible in water and whose boiling point is sufficiently low that it can be removed from the final product by drying and crystallizing the relatively less soluble o-dianisidine base from the solvent containing the dissolved impurities.

21. The method of isolation and purification of benzidine from its naturally occurring impurities, which comprises converting an impure salt of benzidine into its free base in the presence of a sufficient quantity of toluene to dissolve the base and crystallizing out the benzidine base from the resulting toluene solution.

22. The method of isolation and purification of o-tolidine from its naturally occurring impurities, which comprises converting an impure salt of o-tolidine into its free base in the presence of a sufficient quantity of toluene to dissolve the base and crystallizing out the o-tolidine base from the resulting toluene solution.

In testimony whereof we have hereunto subscribed our names.

HENRY J. WEILAND.
IVAN GUBELMANN.